United States Patent [19]
Fujii et al.

[11] Patent Number: 5,218,192
[45] Date of Patent: Jun. 8, 1993

[54] BAR CODE PRINTING MEDIUM

[75] Inventors: Kenichi Fujii, Osaka; Motoki Matsubara, Kishiwada; Hisashi Uemura, Nishinomiya, all of Japan

[73] Assignee: Kanzaki Paper Manufacturing Co., Ltd., Tokyo, Japan

[21] Appl. No.: 704,326

[22] Filed: May 23, 1991

[30] Foreign Application Priority Data

May 29, 1990 [JP] Japan ................. 2-140367
Jul. 30, 1990 [JP] Japan ................. 2-202876

[51] Int. Cl.⁵ ............................................ G06K 19/00
[52] U.S. Cl. ........................... 235/487; 235/468; 235/488; 235/494
[58] Field of Search ............... 235/468, 487, 488, 494

[56] References Cited

U.S. PATENT DOCUMENTS

| | | | |
|---|---|---|---|
| 4,685,138 | 8/1987 | Antes et al. | 235/468 |
| 4,694,148 | 9/1987 | Diekemper | 235/468 |
| 4,880,964 | 11/1989 | Donahue | 235/468 |
| 4,889,367 | 12/1989 | Miller | 235/468 |

*Primary Examiner*—Harold Pitts
*Attorney, Agent, or Firm*—Morgan & Finnegan

[57] ABSTRACT

A bar code printing medium 10 to e applied to an article, the medium 10 having an upper surface on which at least one bar code 12 has been printed, characterized in that the at least one bar code 12 is covered with a colored transparent film 14 having a selective transmittivity in a predetermined wavelength region.

1 Claim, 2 Drawing Sheets

BAR CODE PRINTING MEDIUM

TECHNICAL FIELD

The present invention relates to a bearing medium to be attached to an article and having selectively readable bar codes printed thereon.

BACKGROUND ART

To read bar codes, use is usually made of an exclusive optical scanner, and in that case, an He-Ne laser, semiconductor laser or LED is used, the wavelength of light from these elements is in the range of 6000 Å to 8000 Å.

Some bar codes are used for control of articles on the part of a manufacturer or wholesale section in the course of circulation of articles, while others are used for sales control at the stage of retail of the same articles. Thus, in many cases, each article has attached thereto a plurality of bar code labels to be read individually on different occasions.

In the case where a plurality of bar code labels are attached to each article, the location of application of each label is predetermined and an apparatus is used for controlling its relative position with the bar code reader, in order to automatically select and read one of said labels.

DISCLOSURE OF INVENTION

Accordingly, it is a general object of the invention to provide a bar code printing medium having at lest one bar code label in which the label is distinguished and read at different stage without having to provide said position control device.

The general object is achieved by executing the steps of wrapping an article having at least one bar code label attached thereto with a film sheet defining a colored transparent region having a high degree of light absorption in a ba code reading wavelength region in such a manner that said colored transparent region corresponds to the bar code on said label, and attaching another bar code label to the upper surface of said wrapping sheet, wherein after the bar code on the upper surface of the wrapping sheet has been read, the wrapping paper is stripped and the bar code on the article thus exposed is read.

Thus, when the colored transparent layer is blue, the wrapped article can be seen through the transparent layer; however, even if there is a bar code under said transparent layer, the bar code cannot be read by a bar code reader which uses red light in a wavelength region which cannot permeate the colored transparent layer, since the light is complemented to be blocked by the blue transparent layer; thus, only the bar coded on the upper surface of the colored transparent layer is read. In addition, the positions of the bar codes disposed on the upper and lower sides of the colored transparent layer are preferably shifted.

However, in the aforesaid film attaching system, when the colored transparent film is stripped after the reading of the first bar code, the bar code which is thereby exposed becomes readable, of course, (according to an intended object); However, when an effort is made to reread the previously read bar code, this is impossible since it has already been stripped from the article.

Accordingly, another object of the invention is to provide a printing medium designed such that a first bar code read by a bar code reader before said colored transparent film which absorbs the bar code reading wavelength is stripped from the article, can be read even after the colored transparent film has been stripped so as to read a second bar code.

If the bar code reader is adapted to emit red light, the colored transparent film absorbs said light by blue color; however, if the blue color concentration of the film is not too high, the underlying bar code can be observed through the film with the naked eyes. Thus, if the attribution of bar code which can not be read by the optical reader, but visible by the naked eyes is reversed, that is, making the bar code to be readable by the optical reader and not visible by the naked eyes, then the operator concerned to the article can read the information from the bar code without allowing any other person than the operator to recognize the presence of the bar code.

Accordingly, a further object of the invention is to provide a bar code printing medium designed such that notwithstanding that bar code print marks are made invisible with the human eye by being covered with a colored transparent film, the bar code can be read by a bar code reader.

In a first aspect, the present invention provides a bar code printing medium wherein first and second bar codes to be read at tow stages, respectively, are disposed separate form each other on the same plane, said bar code printing medium being characterized in that said second bar code alone is covered with a colored transparent film whose optical average transmittivity factor in the visible wavelength region (4000~8000 Å) is 50% or above and whose optical average transmittivity factor in the reading wavelength region (6000~7000 Å) associated with bar code reader is 30% or below.

According to the aforesaid first arrangement, at the first stage only the bar code which is not covered with the film is read by the bar code reader while the presence of the bar code which is necessarily read only at the second stage can be ascertained with the human eye at the time of the first stage. Thereafter, by striping said film before reading the second bar code at the second stage, it is possible at the second stage to enable the bar code reader to read both the information available at the first stage and the information necessary only at the second stage. In this manner, there is obtained a bar code printing medium designed such that the presence or absence of the film at the two stages enables the bar codes already read at the first stage to be selectively read at the second stage.

A bar code printing medium of the second aspect of the invention is characterized in that the printed portion of the bar code is covered with a colored film whose optical average permeability factor in the visible wavelength region (4000~8000 Å) is 25% or below and whose optical permeability factor in the reading wavelength region (6000~7000 Å) for a bar code reader is 40% or above.

According to the aforesaid second arrangement, by covering the printed portion of a bar code with a colored film whose optical average permeability factor in the visible wavelength region is low and whose optical permeability factor in the reading wavelength region for a bar code reader is relatively high, a bar code printing medium allowing a bar code, though not visible, to be read by a bar code reader is obtained.

DETAILED DESCRIPTION OF THE EMBODIMENTS

Figure 1:
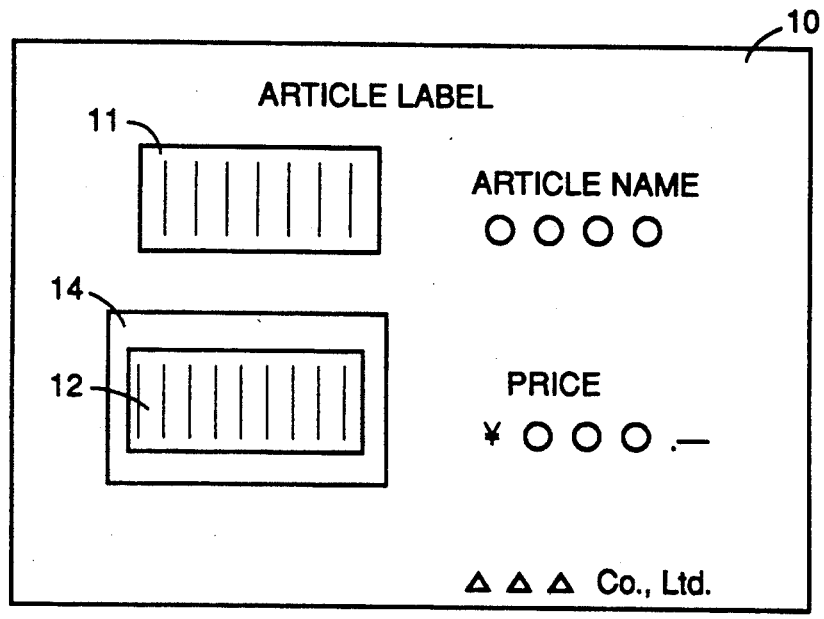
FIG. 1 is a plan view showing an article attachment label serving as a bar code printing medium according to a first embodiment of the invention.

An embodiment of the invention will now be described with reference to FIGS. 1 and 2. In FIG. 1, an article label 10 has bar codes 11 and 12 printed thereon. Generally, the information needed to be read at the time of shipping (at the first stage) is the article name, and this information is written as the bar code 11. The bar code 12 represents, for example, the price information. At the time of shipping, it is desirable that this price information not be readable, but on the other hand it is necessary that it can be ascertained with the eye that this information itself is printed. To this end, a colored transparent film 14 is stuck to the bar code 11 with paste 13. The film 14 has a wavelength characteristic such that the optical average transmittivity factor in the visible wavelength region (4000~8000 Å) is relatively high and the optical transmittivity factor in the reading wavelength region (red light wavelength; 6000~7000 Å) for a bar code reader 15 is low; therefore, the condition required at the time of shipping can be satisfied.

That is, at the time of shipping, when the two bar codes 11 and 12 on the article 16 are swept by the bar code reader 15 adapted to read them with the red light wavelength, only the bar code 11 representing the article name is read and stored as an item of information.

Thereafter, the article is set to a retail store, and the condition required at the time of selling in the retail store (at the second stage) is that both the article name and the price are available.

In the retail store, when the article is sold, the colored transparent film 14 is stripped and then the bar code reader is used for reading.

In addition, the paste 13 used for sticking the film 14 is of the type which is used to stick it to a separate seal after stripping it form the label 10 and which allows restripping. Such paste has tackiness which is lower than that of the non-stripping type but has a characteristic such that it develops a relatively high sticking force on the film and allows the film to be stripped without damaging the bar code printed with an oily high polymer, such as black ink or carbon transfer, or without damaging the label 10 which forms the substrate.

Further, this embodiment shows an example in which the label substrate has non-stripping type paste applied to the lower surface thereof for sticking to an article. However, there are many cases where such labels themselves are singly used rather than being attached to articles, in the course of circulation of articles, and it goes without saying that the present invention is also applicable in such cases.

In other cases, bar codes are printed directly on articles; thus, articles themselves form printing mediums.

In any case, not only the bar code 12 exposed by stripping the film 14 but also the bar code 11 already read (in a different place) is swept by the bar code reader; thus, at this time, both the article name and the price are read and registered as items of information. Therefore, both of the necessary conditions at the time of shipping (at the first stage) and at the time of selling (at the second stage) are satisfied.

Figure 3:
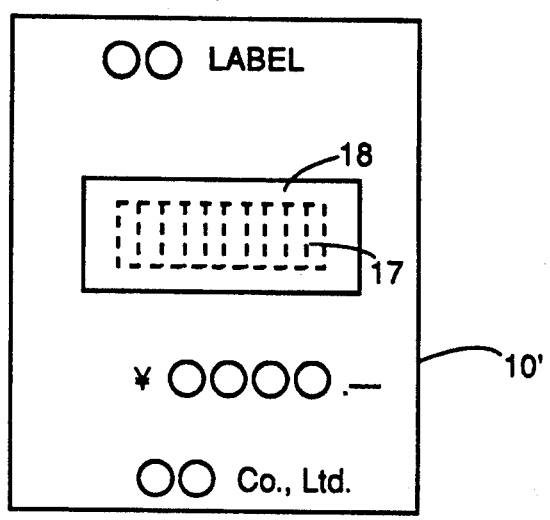
FIG. 3 is a plan view showing an article attachment label serving as a bar code printing medium according to a second embodiment of the invention.
Figure 4:
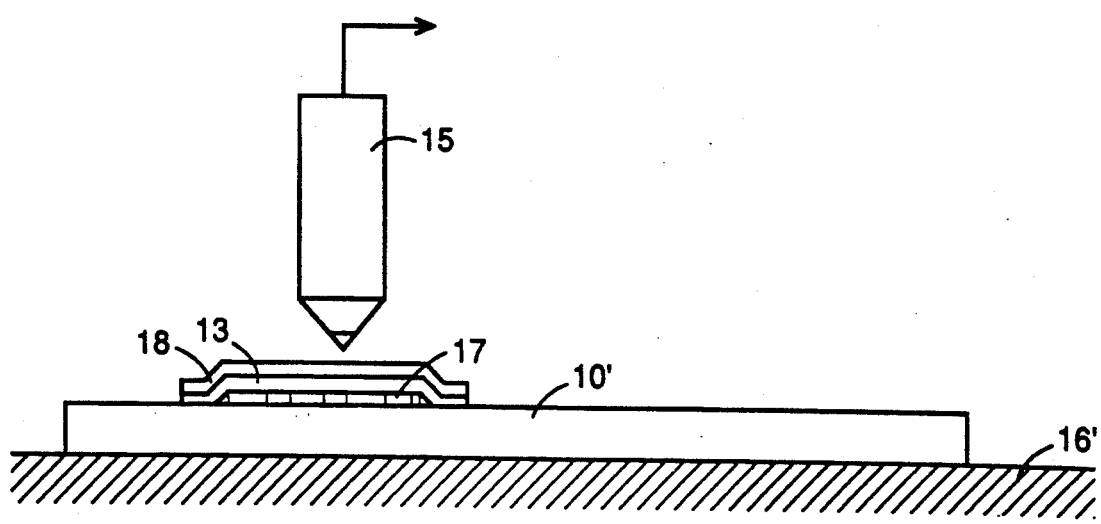
FIG. 4 is a view showing the cross section of the label shown in FIG. 3, together with a bar code reader.

A second embodiment of the invention will now be described with reference to FIGS. 3 and 4. This embodiment is applied to a case where it is desired to read information necessary for circulation of articles form bar codes formed in black-and-white stripe pattern under the condition that they are kept invisible to the human eye in consideration of the nature of the article or for aesthetic purposes.

An article label 10' stuck to an article 16' has a bar code 17 printed thereon in black-and-white stripe pattern for the aforesaid reason, and a colored film 18 is applied thereto to completely cover the printed region by using transparent paste 13.

Since the colored film 18 has a low transmittivity factor in the visible wavelength region, the bar code 17 thereunder is not visible to the eye. However, the colored film 18 has a relatively high transmittivity factor in the reading wavelength region for a bar code reader 15. Therefore, when sweeping is effected by the bar code reader 15, the contents of the bar code 17 optically and electrically treated are read and registered as information.

Since the bar code reader 15 reads with the red wavelength region of light, the colored film appears to be an opaque red film to the eye.

This embodiment shows an example in which the label substrate 10' has non-stripping type paste applied to the lower surface thereof for sticking to the article 16'. However, as in the first embodiment described previously, such label may be singly used rather than being attached to the article 16', in the course of circulation of articles, or the bar code may be printed directly on the article 16'; thus, the article itself forms a bar code printing medium.

Figure 2:
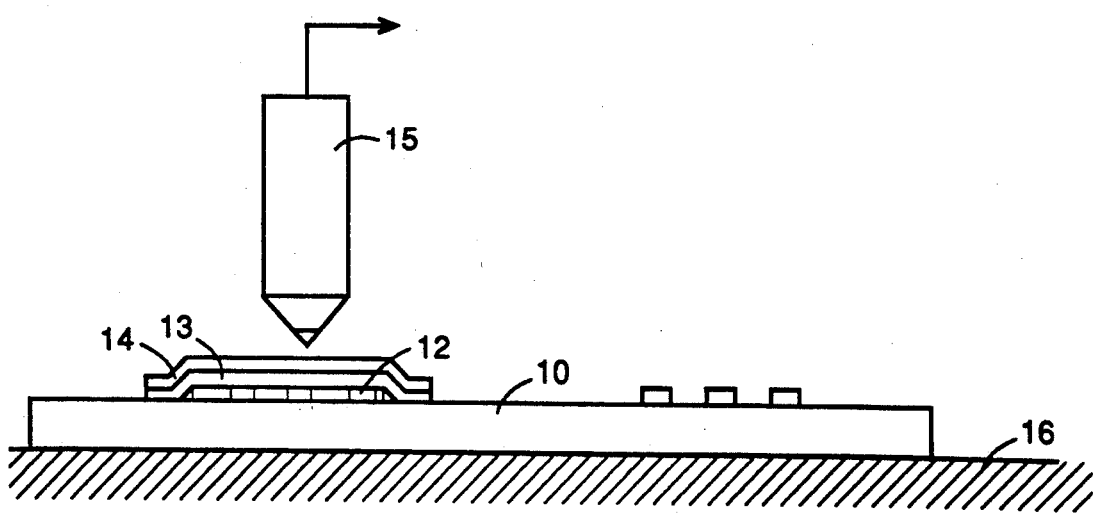
FIG. 2 is a view showing the cross section of the label shown in FIG. 1, together with a bar code reader.

As has so far been described, according to the first arrangement shown in FIGS. 1 and 2, bar codes needed at different stages in the course of circulation of articles can be discriminately read without having to resort to relative position control means for the bar code reader, and at the subsequent stage the bar code which has ben read at the preceding stage can also be read, as needed.

According to the second arrangement of the present invention, in the case where notwithstanding that a bar code formed in black-and-white stripe pattern should not be ascertained with the human eye, it is desired to retain the information, in the form of bar codes on a printing medium, necessary for circulation of articles, reading by a bar code reader is possible in a stage in which the bar codes are not visible to the eye.

What we claim is:

1. A bar code printing medium having a surface on which first and second bar codes to be read at two stages, respectively, are disposed separate from each other, the medium characterized in that the second bar code is covered with a colored transparent film whose optical average transmittivity in a visible wavelength region is 50% or above and whose optical average transmittivity in the reading wavelength region associated with bar code reader is 30% or below, with an inside surface of the colored transparent film being adhered to a surface of the medium and being strippable from of the surface of the medium, whereby the second bar code is visible by the naked human eye while not readable by the bar code reader unless the transparent film is stripped from the surface of the medium.

* * * * *